(12) United States Patent
Pena et al.

(10) Patent No.: US 9,424,667 B2
(45) Date of Patent: Aug. 23, 2016

(54) INTERFACE FOR CONTROLLING AND IMPROVING DRILLING OPERATIONS

(71) Applicant: Schlumberger Technology Corporation, Sugar Land, TX (US)

(72) Inventors: Cesar Pena, Houston, TX (US); Dietmar J. Neidhardt, The Woodlands, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 651 days.

(21) Appl. No.: 13/683,550

(22) Filed: Nov. 21, 2012

(65) Prior Publication Data

US 2013/0127900 A1    May 23, 2013

Related U.S. Application Data

(60) Provisional application No. 61/562,257, filed on Nov. 21, 2011.

(51) Int. Cl.
| | |
|---|---|
| *G06T 11/20* | (2006.01) |
| *G06F 11/32* | (2006.01) |
| *G06F 11/34* | (2006.01) |
| *G06T 11/40* | (2006.01) |
| *G09G 5/00* | (2006.01) |
| *E21B 44/00* | (2006.01) |
| *G06F 3/048* | (2013.01) |

(52) U.S. Cl.
CPC ............... *G06T 11/206* (2013.01); *E21B 44/00* (2013.01); *G06F 11/324* (2013.01); *G06F 11/3409* (2013.01); *G06T 11/40* (2013.01); *G09G 5/003* (2013.01); *G06F 3/048* (2013.01)

(58) Field of Classification Search
CPC ....... G09G 5/003; G06F 3/048; G06F 11/323; G06F 11/324; G06F 11/3409; G06T 11/00; G06T 11/206; G06T 11/40; E21B 44/00
See application file for complete search history.

(56) References Cited

U.S. PATENT DOCUMENTS

| | | | |
|---|---|---|---|
| 4,434,971 A | 3/1984 | Cordrey | |
| 4,951,921 A * | 8/1990 | Stahl | ................. C08F 226/06 166/270 |
| 6,382,331 B1 | 5/2002 | Pinckard | |
| 6,405,136 B1 * | 6/2002 | Li | ......................... H03M 7/30 175/45 |
| 2002/0060093 A1 | 5/2002 | Womer et al. | |
| 2004/0257240 A1 * | 12/2004 | Chen | ..................... G01V 3/38 340/853.1 |
| 2005/0012637 A1 * | 1/2005 | Golla | ................... G01V 11/002 340/853.3 |
| 2005/0038631 A1 * | 2/2005 | Steinke | ........................ 702/182 |
| 2005/0096847 A1 * | 5/2005 | Huang | ............................ 702/9 |

(Continued)

OTHER PUBLICATIONS

Marshall, Daniel, "Ternplot: An excel spreadsheet for ternary diagrams", Computers & Geosciences, vol. 22, No. 6, 1996, pp. 697-699.*

(Continued)

*Primary Examiner* — Michelle L Sams

(57) ABSTRACT

A system including a display for displaying a comparison between a calculated energy value and a desired energy value of a drilling system, the display including a first portion defining a first potential operational issue, a second portion defining a second potential operational issue, a third portion defining a third potential operational issue, and a fourth portion indicating the comparison between the calculated energy value compared and the desired energy value of the drilling system.

17 Claims, 8 Drawing Sheets

(56) References Cited

U.S. PATENT DOCUMENTS

2006/0162962 A1    7/2006   Koederitz et al.
2008/0156531 A1    7/2008   Boone et al.
2010/0133008 A1*   6/2010   Gawski et al. .................. 175/45
2010/0318934 A1*  12/2010   Blevins et al. ................ 715/772
2013/0065206 A1*   3/2013   Russell et al. ................ 434/219

OTHER PUBLICATIONS

International Search Report and Wrtitten Opinion Issued in International Application No. PCT/US2012/066266, Dated Feb. 28, 2013 (13 Pages).

* cited by examiner

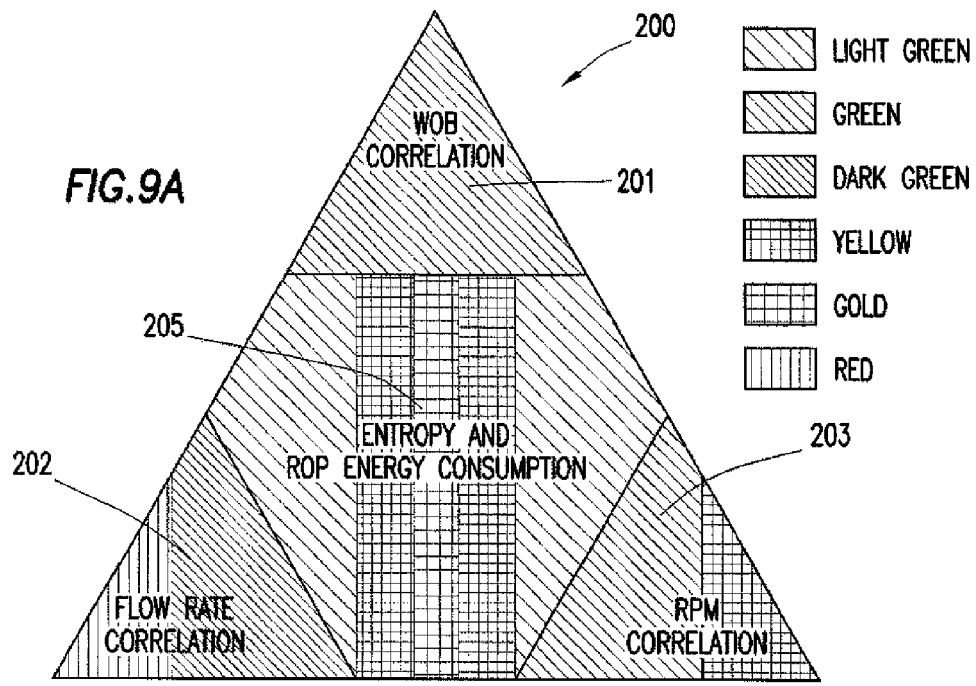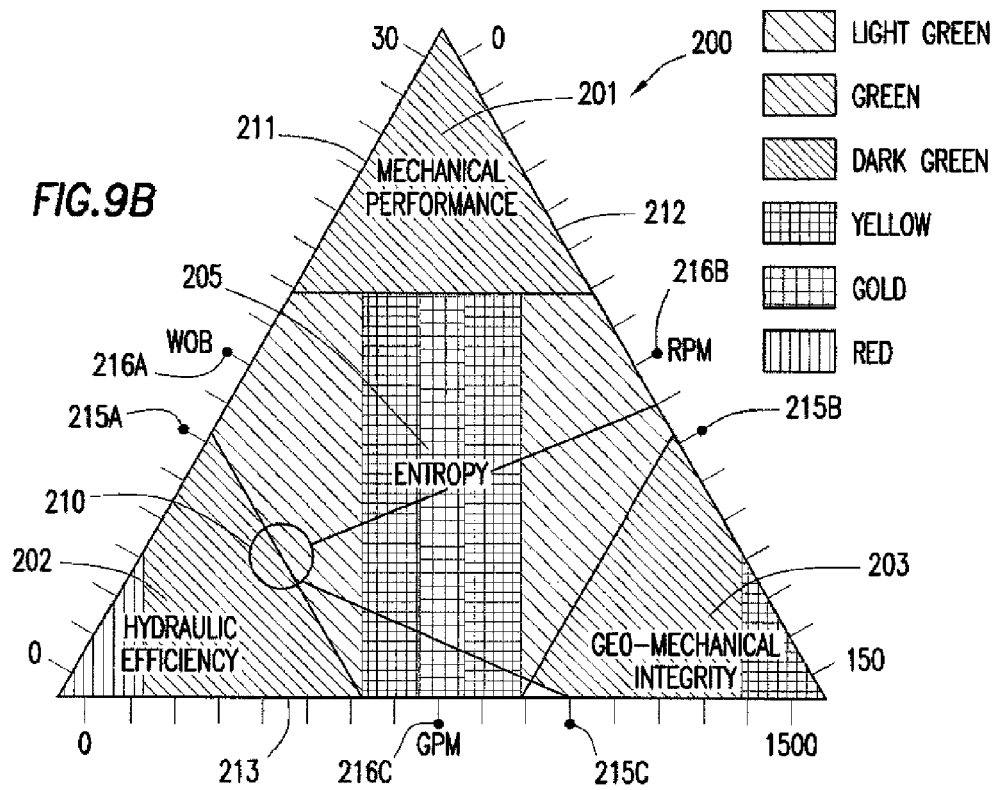

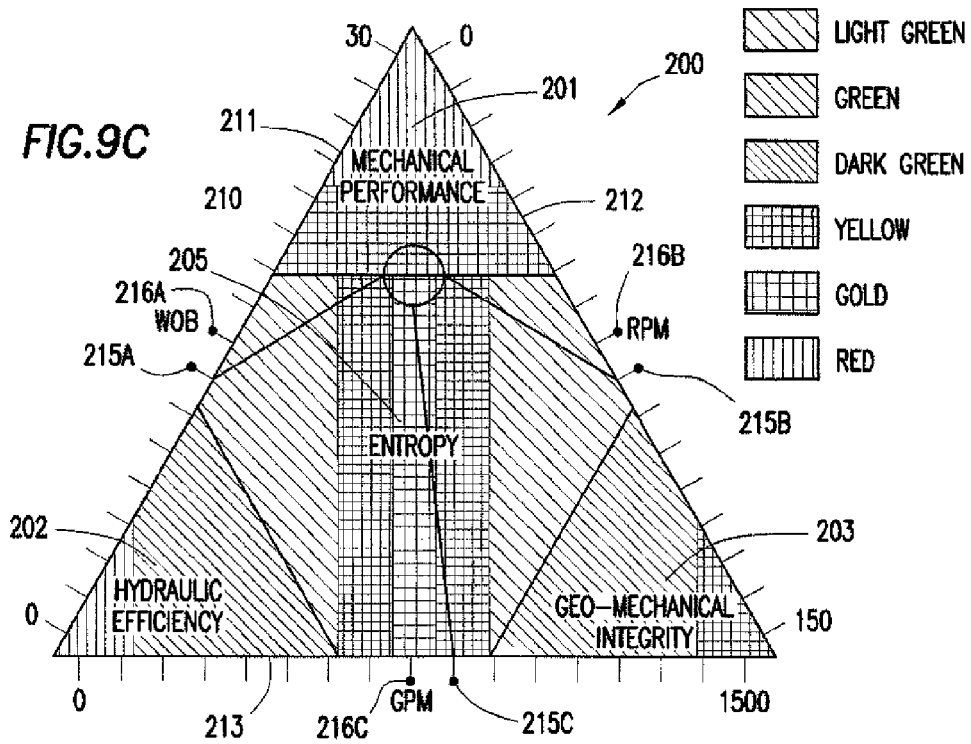
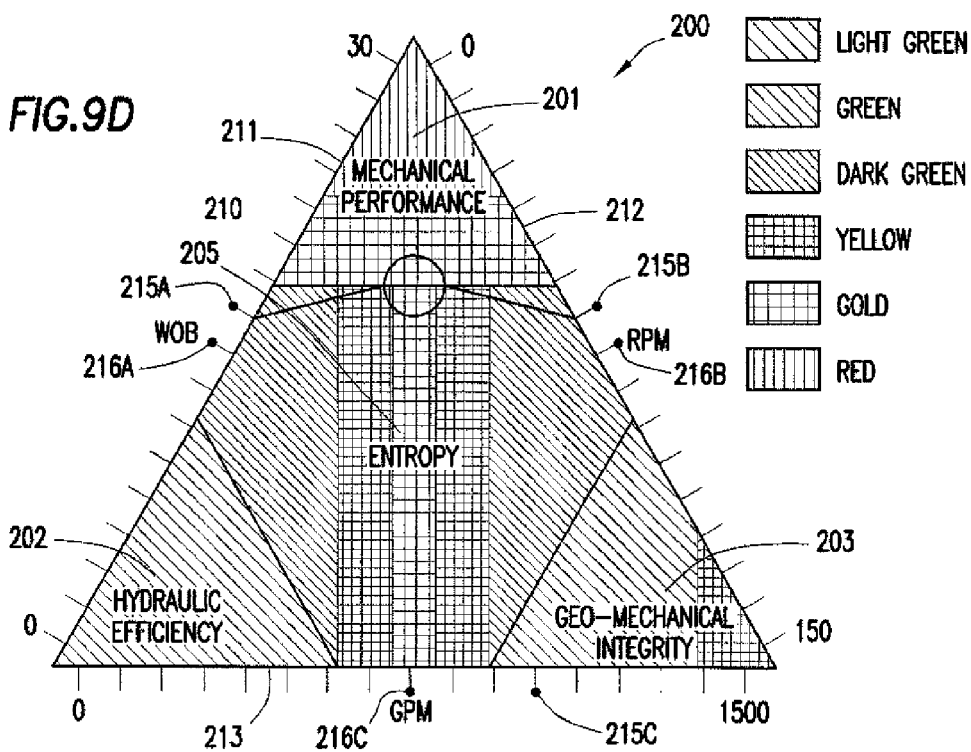

INTERFACE FOR CONTROLLING AND IMPROVING DRILLING OPERATIONS

CROSS-REFERENCE TO RELATED APPLICATIONS

This application claims the benefit of U.S. Provisional Patent Application No. 61/562,257, entitled "Interface for Controlling and Improving Drilling Operations", filed Nov. 21, 2011, which is herein incorporated by reference.

FIELD OF DISCLOSURE

The present disclosure relates generally to the field of drilling and processing of wells. More particularly, one or more embodiments relate to displaying and using energy consumption evaluation for detecting drilling issues and determining appropriate mitigation strategies.

BACKGROUND

In conventional oil and gas operations, a well is typically drilled to a desired depth with a drill string, which includes drill pipe and a drilling bottom hole assembly (BHA). Throughout this process, several drilling parameters generally affect drilling performance (i.e., rate at which the well is drilled to the desired depth). These parameters may include, among others, load applied to the BHA, rotational speed of the drill string being turned by a top drive or kelly drive, torque applied at the rotating BHA, and flow rate of drilling mud pumped through the drill string. The drilling performance are typically monitored throughout the drilling process.

Rig operators often rely on the drilling performance in order to make decisions and/or to make adjustments to the drilling parameters during drilling operation. However, this performance may fluctuate rapidly due to variability in the mechanical and hydraulic setup of the drilling rig and/or noise in sensors used to monitor the parameters. Due to the inherent variability of the drilling performance, it may be difficult for rig operators to detect the outset of drilling issues, especially when the drilling issues originate down-hole in response to geo-mechanical or lithological phenomena. Failure to react to such drilling issues in a timely manner frequently leads to low performance, and attempts to mitigate the issues, once recognized, are not always effective. Occasionally, mitigation attempts exacerbate the drilling issue, causing equipment damage, consumable losses, and extended periods of non-productive time.

SUMMARY

According to one aspect of the present disclosure, there is provided a system, the system including a triangular-shaped display for displaying a comparison between a calculated energy value and a desired energy value of a drilling system, the display including a first corner portion defining a first potential operational issue, a second corner portion defining a second potential operational issue, a third corner portion defining a third potential operational issue, and a central portion indicating the comparison between the calculated energy value compared and the desired energy value of the drilling system.

According to another aspect of the present disclosure, there is provided a method, the method including displaying a comparison between a calculated energy value a desired energy value, determining a deviation of the calculated energy value from the desired energy value, displaying one of a first color, a second color, and a third color based on the deviation of the calculated energy value from the desired energy value, identifying a drilling parameter value that significantly correlates with the deviation of the calculated energy value from the desired energy value, determining an adjustment to the drilling parameter value such that, when the adjustment to the drilling parameter is made, the calculated energy value approaches the desired energy value, and implementing the adjustment to the drilling parameter.

According to another aspect of the present disclosure, there is provided a non-transitory computer-readable medium including code adapted to calculate an energy value from received drilling parameter values and a received drilling performance value for a drilling system, code adapted to identify a drilling parameter value that significantly correlates with a deviation of the calculated energy value from a desired energy value, code adapted to perform a statistical analysis for determining an adjustment to the drilling parameter value such that, when the adjustment is made, the energy value approaches the desired energy value, and code adapted to display a comparison between a calculated energy value and a desired energy value on a triangular-shaped display. In one or more embodiments, the display may include a first corner portion defining a first potential operational issue, a second corner portion defining a second potential operational issue, a third corner portion defining a third potential operational issue, and a central portion indicating the comparison between the calculated energy value compared and the desired energy value of the drilling system.

This summary is provided to introduce a selection of concepts that are further described below in the detailed description. This summary is not intended to identify key or essential features of the claimed subject matter, nor is it intended to be used as an aid in limiting the scope of the claimed subject matter.

Other aspects and advantages will be apparent from the following description and the appended claims.

BRIEF DESCRIPTION OF DRAWINGS

FIG. 9A shows a display showing relatively high entropy in the drilling system, particularly relating to flow rate and/or hydraulic efficiency.

FIG. 9B shows the display of FIG. 9B, in which hydraulic efficiency has been targeted as the problem area.

FIG. 9C shows the display of FIG. 9B, in which the system entropy relating to hydraulic efficiency has been reduced, and the mechanical performance of the drilling system has been targeted as the problem area.

FIG. 9D shows the display of FIG. 9C, in which the system entropy relating to hydraulic efficiency has been further reduced due to changes in some of the drilling parameters, and the mechanical performance of the drilling system has still been targeted as the problem area.

DETAILED DESCRIPTION

It is now recognized that there exists a need for improved and different systems and methods for identifying a drilling issue at its outset and determining the appropriate adjustments to certain drilling parameters for mitigating the drilling issue. Accordingly, one or more embodiments of the present disclosure are directed to systems and methods to display aspects of drilling performance to a user which uses relative energy consumption evaluation to identify drilling issues and to recommend drilling parameter adjustments in response to the drilling issues. One or more embodiments are directed to systems and methods for displaying drilling parameter values (e.g., weight on bit, rotational speed of a drilling feature, torque applied by the drilling feature, drilling mud flow rate, etc.) and drilling performance values (e.g., one or more values indicative of drilling progression) in real time to identify the outset of drilling issues and determine appropriate mitigation strategies.

One or more embodiments of the present disclosure are directed to systems and methods for displaying quantitative determinations of the outset of drilling issues through statistical analysis of energy consumption throughout drilling operations. For example, such analysis may include statistical evaluation of relative energy consumption values. The drilling system receives drilling parameter values and a drilling performance value from sensors located on the drilling rig, and calculates an energy value (i.e., a value related to energy consumption) based on the drilling parameter values and drilling performance value. The drilling system then determines a deviation of the calculated energy value from a desired energy value and identifies one or more drilling parameters that significantly correlates with the deviation. If the deviation exceeds a certain threshold, the drilling system determines an adjustment to the one or more drilling parameters through statistical analysis (e.g., a linear regression) that, when applied, causes the calculated energy value to approach the desired energy value. Finally, the drilling system may indicate the desired adjustment, on a visible display, to the drilling operator so that appropriate actions may be taken to mitigate the drilling issue, either automatically by the drilling system or manually by a user.

Figure 1:
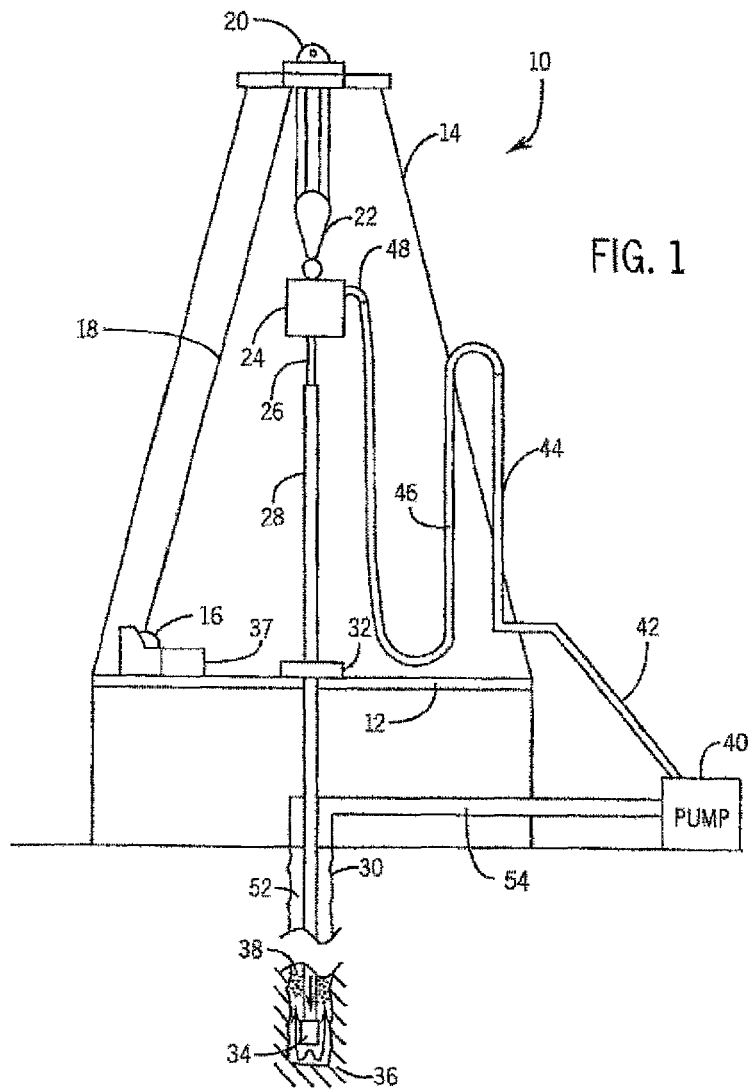
FIG. 1 is a schematic of a well being drilled in accordance with embodiments disclosed herein.

Referring now to FIG. 1, a schematic representation of a drilling rig 10 in the process of drilling a well in accordance with embodiments disclosed herein is shown. The drilling rig 10 features an elevated rig floor 12 and a derrick 14 extending above the floor 12. A drawworks 16 supplies drilling line 18 to a crown block 20 and traveling block 22 in order to hoist various types of drilling equipment above the rig floor 12. The traveling block 22 may support a top drive 24, which features a quill 26 used to turn tubular or other drilling equipment. In the illustrated embodiment, the quill 26 is coupled with a drill string 28, which is a total length of connected casing, drill pipe, or the like, extending into a well bore 30. One or more motors housed in the top drive 24 facilitate the rotation of the drill string 28 at a desired speed as specified by a rig operator.

While a new tubular length is being attached to the drill string 28, the drill string 28 may be held stationary with respect to the rig floor 12 by a rotary table 32. In order to advance the well bore 30 to greater depths, the drill string 28 features a bottom hole assembly (BHA), which includes a drill bit 34 for crushing or cutting rock away from a formation 36. Drilling mud may be circulated through the drilling rig 10 in order to remove cuttings 38 from the well bore 30. A mud pump 40 pumps the drilling mud through a discharge line 42, stand pipe 44, rotary hose 46, gooseneck 48 leading into the top drive 24. From here the drilling mud flows through the top drive 24 and down a channel through the drill string 28, exiting the drill string 28 through the drill bit 34 and through an annulus 52 formed between the well 30 and the drill string 28. A drilling mud return line 54 conveys the drilling mud and the cuttings 38 away from the annulus 52, returning the mud toward the pump 40. The mud, with the cuttings 38, may pass through a series of tanks (not shown) and other components used to separate the cuttings 38 from the drilling mud before the mud is circulated again by the pump 40.

It should be noted that FIG. 1 is merely a representative embodiment, and certain illustrated features may be different in other embodiments. For example, the drilling rig 10 may use a kelly drive system in conjunction with the rotary table 32 to turn the drill string 28 at a desired rotational speed, instead of the top drive 24. In addition, the drill string 28 may remain generally stationary while a down-hole motor located near the BHA rotates the drill bit 34.

Several factors may influence performance of the drilling rig 10, the performance being typically characterized by the speed at which the drill string 28 advances into the well bore 30, known as rate of penetration (ROP). For example, the drawworks 16 may contribute to a combined downward force applied to the drill bit 34 known as weight on bit (WOB). That is, the drawworks 16 may provide increasing lengths of drilling line 18 to the crown block 20 and the traveling block 22, increasing the WOB available for cutting forcefully into the formation 36. An autodriller 37 may be present on the drill rig 10 for controlling the drawworks 16 in response to the monitored performance of the drilling rig 10. That is, when the performance of the drilling rig 10 falls below a certain desired performance threshold, the autodriller 37 may utilize a processor and programming to automatically control the drawworks 16 to increase WOB in order to increase the performance.

In addition to WOB, the speed at which the top drive 24 rotates the drill string 28 may influence the performance of the drilling rig 10. Increasing the speed of rotation of the drill string 28 increases the speed at which an outer surface of the drill bit 34, featuring teeth, cutters, and/or inserts contacts the formation 36. The torque applied by the drill bit 34 contacting an inside edge of the formation 36 while cutting rock also influences the performance of the drilling rig 10. Further, the flow rate of drilling mud pumped through the drill string 28 and the well bore 30 may contribute to drilling performance, as a higher flow rate may remove the cuttings 38 from the annulus 52 faster, allowing the drill bit 34 to advance faster. Each of these drilling parameters, as discussed in detail below, may be interrelated, affecting each additional parameter as well as performance and specific energy of the drilling rig 10. When the drilling rig 10 encounters issues that are geo-mechanical, lithological, or related to energy consumption, the parameter values and performance value may be utilized to determine effective mitigation strategies, improving performance and energy utilization of the drilling rig 10.

It should be noted that the drilling rig 10 illustrated in FIG. 1 is intentionally simplified to focus on components contributing to the drilling parameters that may be adjusted to optimize drilling performance as described in the present disclosure. Many other components and tools may be employed during the various periods of formation and preparation of the well bore 30. Similarly, as will be appreciated by those skilled in the art, the orientation and environment of the well bore 30 may vary widely depending upon the location and situation of the formations of interest. For example, rather than a surface (land-based) operation, the well bore 30 may be formed under water of various depths, in which case the topside equipment may include an anchored or floating platform.

Figure 2:
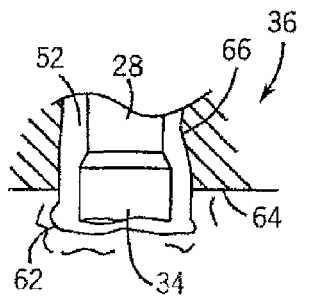
FIG. 2 is a partial cutaway view of a well bore with a drill bit advancing through a rock formation change.
Figure 3:
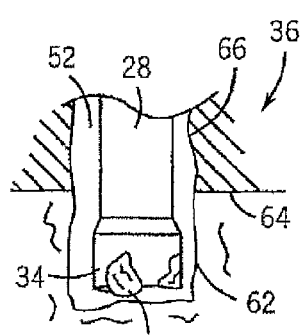
FIG. 3 is a partial cutaway view of the well bore of FIG. 2 with the drill bit accumulating clay shale while advancing through the formation.
Figure 4:
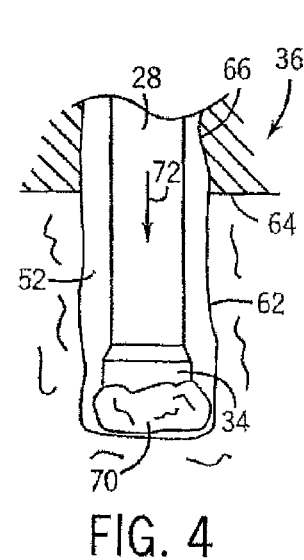
FIG. 4 is a partial cutaway view of the well bore of FIG. 2 showing an occurrence of bit balling.

FIGS. 2-4 illustrate a drilling issue that may be detected and identified through the use of energy consumption analysis in accordance with the present disclosure. The illustrated issue, known as bit-balling, may occur as the drill string 28 advances into a relatively soft formation, such as clay shale 62 located near a river. FIG. 2 illustrates the drill bit 34 advancing through a formation change 64 from a relatively hard formation, such as black organic shale 66, to the clay shale 62. As the drill bit 34 continues to cut into the clay shale 62, stress release hydration may occur at the bottom of the well bore 30. That is, the force applied by the drill bit 34 to destroy the clay shale 62 may extract water from the clay shale 62 and other available sources of water, including the surface of the drill bit 34. This leads to cuttings 38 adhering onto the drill bit 34, as shown in FIG. 3. Because this issue generally occurs downhole as the drill string 28 advances through a formation change 64, it may initially go undetected by operators of the drilling rig 10. In fact, the drilling rig 10 may be equipped with an autodriller that increases the WOB automatically in response to a decreasing rate of penetration (ROP) of the drill string. The end result, as illustrated in FIG. 4, may be a relatively large clay ball 70 formed around the drill bit 34. This clay ball 70 may cover the sharp surfaces of the drill bit 34 and, consequently, reducing the effectiveness of the drill bit 34 and, consequently, reducing the ROP of the drilling string 38 beyond an allowable level. Automatically increasing the force applied to the drill string 28, as indicated by arrow 72, may exacerbate the issue further.

One or more embodiments of the present disclosure are directed to systems and methods to display a comparison between a calculated energy value and a desired energy value of a drilling system. Being able to visualize the comparison between the calculated energy value and the desired energy value of the drilling system may allow a user to focus on particular operational issues and individually address potential problem areas by manipulating drilling parameter values based on this comparison. These systems and methods may allow a user to identify drilling issues at or near its outset, which may save valuable time and equipment. For example, the issue of bit-balling may be identified at or near its outset when the drill bit 34 first enters the clay shale 62. As a result, the system may determine and inform a user of an inefficiency, and may provide a suggested manner to mitigate or eliminate the issue, such as changing the flow rate of drilling mud.

Figure 5:
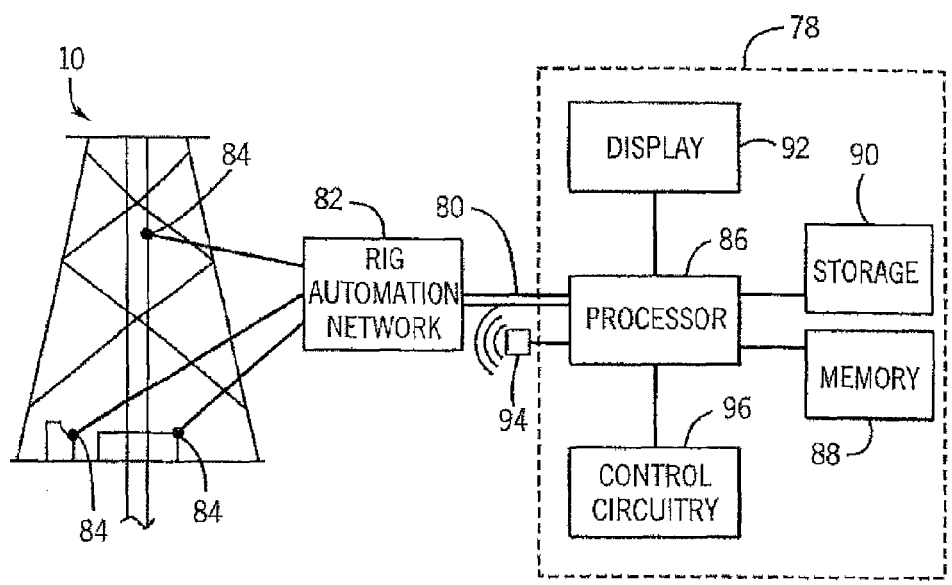
FIG. 5 is a schematic representation of a drilling system configured to determine adjustments to drilling parameter values in accordance with embodiments disclosed herein.

FIG. 5 is a schematic representation of a drilling system 78 used to identify drilling issues, such as bit-balling, and determine effective mitigation strategies. The illustrated drilling system 78 includes a communication component 80, a processor 86, a memory component 88, a storage component 90, a display 92, an audible indication device 94, and control circuitry 96. It should be noted that the illustrated drilling system 78 is meant to be representative, and other drilling systems 78 may include additional components or may operate in absence of certain illustrated components.

The communication component 80 of the drilling system 78 is configured to receive drilling parameter values and one or more drilling performance values related to operations of the drilling rig 10. The communication component 80 may be a serial cable coupled with a rig automation network 82, which aggregates measurements monitored by a number of sensors 84 placed about the drilling rig 10, as shown in the illustrated embodiment. The sensors 84 may monitor current, voltage, resistivity, force, position, weight, strain, speed, rotational speed, or any other measurement related to drilling parameters or drilling performance, and relevant input values may be aggregated as raw sensor measurements or as scaled engineering values. In one embodiment, the communication component 80 may receive drilling parameter values and a drilling performance value directly from the sensors 84, retrofitted to certain pieces of equipment on the drilling rig 10, such that the sensors 84 effectively form part of the drilling system 78. This type of data acquisition may allow for higher sampling rates to be used for monitoring relevant drilling parameter values and drilling performance values.

The processor 86 of the drilling system 78 may receive various inputs from the communication component 80 such as the drilling parameter values and drilling performance values, and certain calculated values. In addition, the processor 86 may be operably coupled to the memory component 88 and the storage component 90 to execute instructions for carrying out the presently disclosed techniques. These instructions may be encoded in programs that may be executed by the processors 86 to calculate the energy value and determine the appropriate adjustment. The codes may be stored in any suitable article of manufacture that includes at least one tangible non-transitory, computer-readable medium (e.g., a hard drive) that at least collectively stores these instructions or routines, such as the memory component 88 or the storage component 90.

The display 92 coupled with the processor 86 may be used to visibly display the adjustment determined by the processor 86, directing a drilling operator to adjust a drilling parameter appropriately at the outset of a drilling issue. In addition, the display 92 may show traces of at least the drilling parameter values, drilling performance values, and energy values with respect to time. Other values derived from the drilling parameter values, drilling performance value, and energy values may be traced on the display as well. The audible indication device 94 may output an alarm or other audible indication to alert the drilling operator of the outset of a drilling issue and an appropriate parameter adjustment for mitigating the issue. Certain drilling systems 78 may be equipped with control circuitry 96 designed to control certain drilling parameters of the drilling rig 10, such that an adjustment determined by the processor 86 may be automatically implemented in the appropriate drilling equipment. For example, if the processor 86 determines that the flow rate of the drilling mud should be increased in order to prevent bit balling based on analysis of the drilling parameter values, the control circuitry 96 may automatically signal the pump 40 to increase the flow rate.

Figure 6:
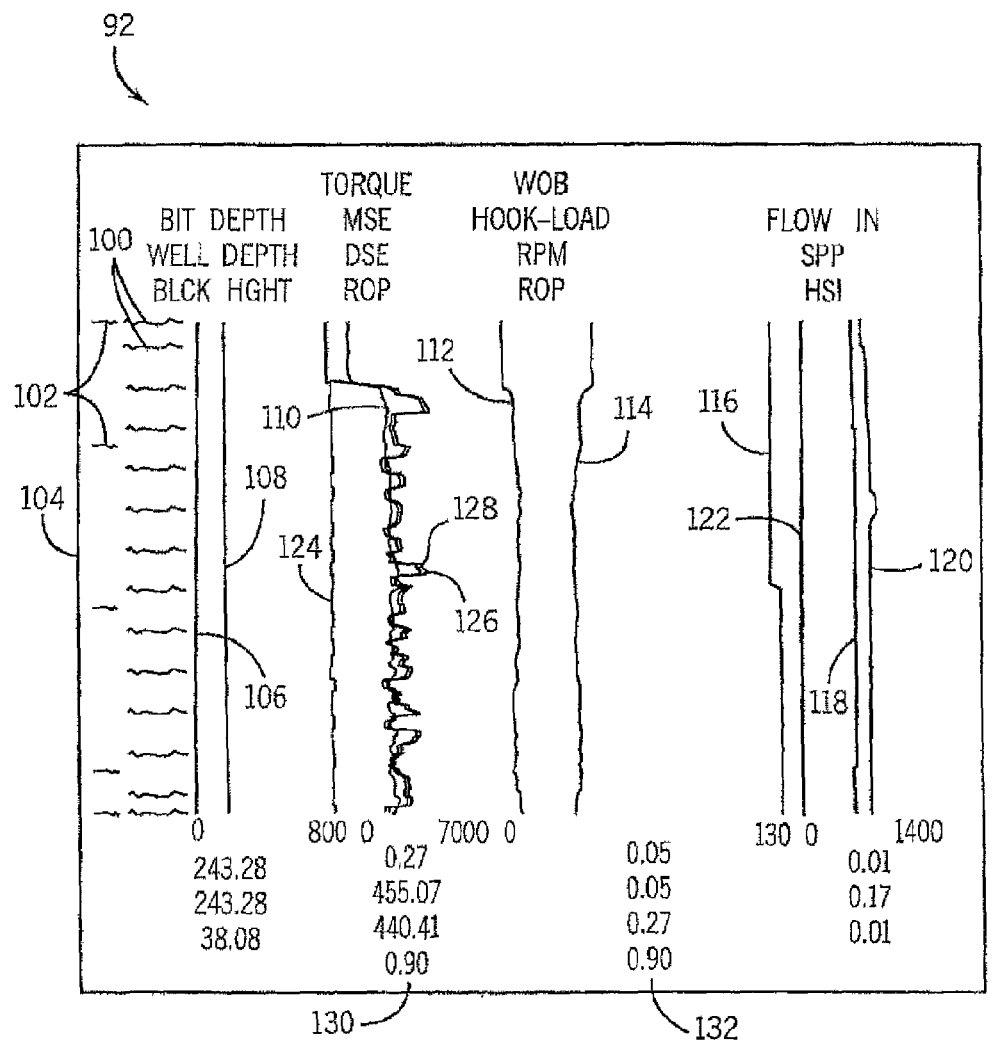
FIG. 6 shows a display showing traces of various drilling parameter values, performance parameter values, and energy consumption values in accordance with embodiments disclosed herein.

FIG. 6 is an example representation of the display 92 of the drilling system 78, showing traces related to certain drilling parameter values and performance values that may be used to identify and mitigate drilling issues (e.g., bit-balling, stick/slip vibrations, etc.) in accordance with present techniques. The display 92 includes traces for drilling parameter values that may be aggregated in real-time or with an inherent delay during drilling operations. In the illustrated embodiment, numerical values of time 100 and well depth 102 are displayed along a vertical axis 104. In addition to numerical readouts, the display 92 may show traces of drilling parameter values monitored by the sensors 84, including a block height 106, well depth 108, bit depth (aligned with the well depth 108), torque 110 of a drilling feature (e.g., the drill bit 34), WOB 112, hook-load 114, rotational speed (RPM) 116 of a drilling feature (e.g., the drill bit 34), flow rate 118 of drilling mud, stand pipe pressure (SPP) 120, and hydraulic horsepower per square inch (HIS) 122 of drilling mud. Other drilling parameter values may be received from the sensors 84 or interpreted from sensor data, and some drilling parameter values may be related to others or monitored using the same sensors (e.g., WOB 112 and hook-load 114). In some embodiments, different illustrative techniques may be employed for data representation.

A drilling performance value may be received by the system and traced on the display 92 with respect to time 100 as well. The drilling performance value is a value indicative of drilling progression (e.g., rate of penetration (ROP) 124 of the drill string 28 progressing downward into the well bore 30). In some embodiments, the drilling performance value may be a monitored or calculated drilling efficiency metric. As previously noted, drilling performance values such as the ROP 124 may be affected by the drilling parameter values throughout drilling operation. For example, increasing the WOB 112 provides a greater amount of force to the drill bit 34 for cutting into the formation 36, thereby increasing the ROP 124. The drilling parameters may affect the ROP in different ways depending on the equipment used on the particular drilling rig 10, the sharpness or dullness of the drill bit 34, and certain lithological features of the formation 36, as will be apparent to one skilled in the art. For example, a combination of drilling parameters that may produce a satisfactory level of the ROP 124 in one formation may produce less desirable performance results in another formation.

The display 92 of FIG. 6 features other traces of values that the drilling system may calculate from certain drilling parameter values and the performance value, such as mechanical specific energy (MSE) 126. The MSE 126 is a metric that may be used to determine the linear relationship between increasing drilling parameter values (i.e., RPM 116, WOB 112, and torque 110) and the performance value (ROP 124). Equation (1) below represents a general relationship of the MSE 126 to these drilling parameter values 116, 112, and 110 and the ROP 124.

$$MSE = \frac{WOB}{A_B} + \frac{120 * \pi * RPM * T}{A_B * ROP} \quad \text{equation (1)}$$

Certain drilling parameter values received by the drilling system may be used to calculate a drilling specific energy (DSE) 128 as well, and this relationship is represented in equation (2) below:

$$DSE = \frac{WOB}{A_B} + \frac{120 * \pi * RPM * T}{A_B * ROP} - \frac{1,980,000 * \lambda * HP_B}{ROP * A_B} \quad \text{equation (2)}$$

The MSE 126 and DSE 128 quantify, linearly, the amount of energy that may be consumed while destroying, through drilling, a given volume of rock. In both specific energy equations (1) and (2), $A_B$ represents a cross-sectional area of the drill bit 34 and T represents the torque 110. For calculating the DSE 128 according to equation (2), $\lambda$ represents a density of the drilling mud, and $HP_B$ represents hydraulic power, which may be calculated from the flow rate 118.

Values of the MSE 126 and DSE 128 of a drilling rig 10 at a given moment may be calculated in a relative manner or an absolute manner. In the illustrated embodiment, the MSE 126 and DSE 128 are calculated in a relative manner through equations (1) and (2) listed above, respectively, though in other embodiments these may be calculated in an absolute manner. An absolute determination of the MSE 126 or DSE 128 may be based partially on factors related to the specific formation 36 being drilled, the equipment (e.g., top drive) used, and other factors that vary from rig to rig. As such, the MSE 126 and DSE 128 may be determined absolutely by referencing logs of typical values of energy consumption for related drilling operations.

It should be noted that the MSE 126 and DSE 128 are each linearly correlated to drilling parameter values including at least WOB 112, RPM 116, and torque 110. The DSE 128 is linearly correlated with the flow rate 118 as well, and both the MSE 126 and DSE 128 are proportional to the ROP 124. Other relative energy values may be calculated such that the energy value is linearly correlated with the drilling parameter values (i.e., at least the WOB 112, RPM 116, and torque 110) and proportional to the ROP 124. In addition, the MSE 126 and DSE 128 may be scaled and/or combined to determine other related metrics that may be useful for energy consumption analysis. Other correlations may be desirable, as will be appreciated by those skilled in the art, that relate energy consumption to various drilling parameter values, drilling performance values, and/or drilling efficiency.

The MSE 126, DSE 128, or other energy value linearly correlated with drilling parameters and proportional to the ROP 124 may be used to assess drilling efficiency. Drilling efficiency may be assessed in terms of consumption of the energy available for cutting rock. That is, calculations may be made to quantify the amount of relative available energy (i.e., the MSE 126 or DSE 128) consumed throughout the process of destroying the formation 36, as quantified by the ROP 124. The illustrated display 92 includes values corresponding to these relative efficiency measurements, specifically a percentage 130 of the MSE 126 being consumed while advancing the well bore 30 and a percentage 132 of the DSE 128 being consumed while advancing the well bore 30. FIG. 6 illustrates the percentages 130 and 132 each being equal to 0.90, meaning that ninety percent of the relative MSE 126 and DSE 128 is essentially being used to destroy rock.

As the well bore 30 is advanced, the drilling parameters, including the WOB 112, RPM 116, and torque 110, may be held relatively constant at a desired level. If the formation 36 maintains similar lithological characteristics and the drill bit 34 and other equipment operate as desired, the ROP 124 shown on the display 92 may remain relatively constant. When issues arise, such as the drill string 28 passing through the formation change 64 of FIGS. 2-4 or the drill bit 34 becoming excessively worn and unable to cut properly, the ROP 124 may be affected, and the amount of energy (MSE 126 or DSE 128) available for aspects related to operation of the drilling rig 10 (e.g., destroying rock) may be utilized less efficiently. Therefore, variations in the ROP 124, MSE 126 or DSE 128 may indicate an issue arising downhole.

Since the drilling parameter values 110, 112, 114, 116, 118, 120, and 122 and the ROP 124 are received from sensor measurements, there may be a certain level of noise in the signals sent from the sensors 84. Such noise, as well as fluctuations in mechanical and hydraulic equipment, may lead to an inherent variation in the parameters used to calculate the MSE 126 and DSE 128, even when the drilling rig 10 operates as desired. However, when issues arise downhole, the variation of the MSE 126 or DSE 128 may exceed a threshold of acceptable variation. For example, the torque 110, WOB 112, and RPM 116 may remain steady while the ROP 124 decreases, indicating inefficient drilling. In response, an autodriller coupled with the drawworks 16 may increase the WOB 112 in order to return the ROP 124 to a desired amount. In this case, variation in the ROP 124 may remain relatively constant, but variation in the MSE 126 and DSE 128 may increase as a greater amount of energy is consumed by the drilling system in order to maintain the desired ROP 124.

Variation within the calculated MSE 126 and DSE 128 may be representative of entropy in the drilling rig 10 (i.e., inefficient drilling), indicating the outset of drilling issues such as dysfunction of the drill bit 34, bit-balling, slip/stick vibrations of the drill string 28, and the like. To evaluate the amount of variation, the processor 86 of the drilling system 78 may determine a deviation of the calculated energy value (MSE 126, DSE 128, etc.) from a desired energy value. The processor 86 may use code stored in the memory component 88 to calculate the desired energy consumption from previously calculated or observed energy requirements (MSE 126, DSE 128, etc.) that are stored in the memory component 88. Drilling issues may be indicated when the deviation exceeds a threshold value of acceptable variation within the assessment of energy consumption, as determined by a transient standard deviation of the calculated energy over time. In this way, the level of variability that distinguishes acceptable energy consumption from unacceptable energy consumption may be determined based on typical performance of the drilling rig 10. Indeed, relative values may be utilized based on historical energy consumption values such that present embodiments may be essentially customized for each application.

The drilling system 78 may also identify specific drilling parameters that may be adjusted to mitigate the issue. For example, the most prominent factor in a particular energy value change may be identified. Once the deviation of the calculated energy value from the desired energy value is determined, a transient standard deviation and/or variance calculation may be used to quantify the weighted contribution of each drilling parameter value to the deviation. Correlation coefficients for each drilling parameter value determined from these calculations may be compared to determine one drilling parameter value that predominantly varies with the deviation of the energy value. Instructions or code adapted to perform this transient standard deviation analysis may be stored in the memory component 88 of the drilling system 78. Once the drilling parameter value that most significantly correlates with the deviation of the energy value is identified, the drilling system 78 may determine, through statistical analysis, an adjustment to the drilling parameter value that may mitigate the issue.

Figure 7:
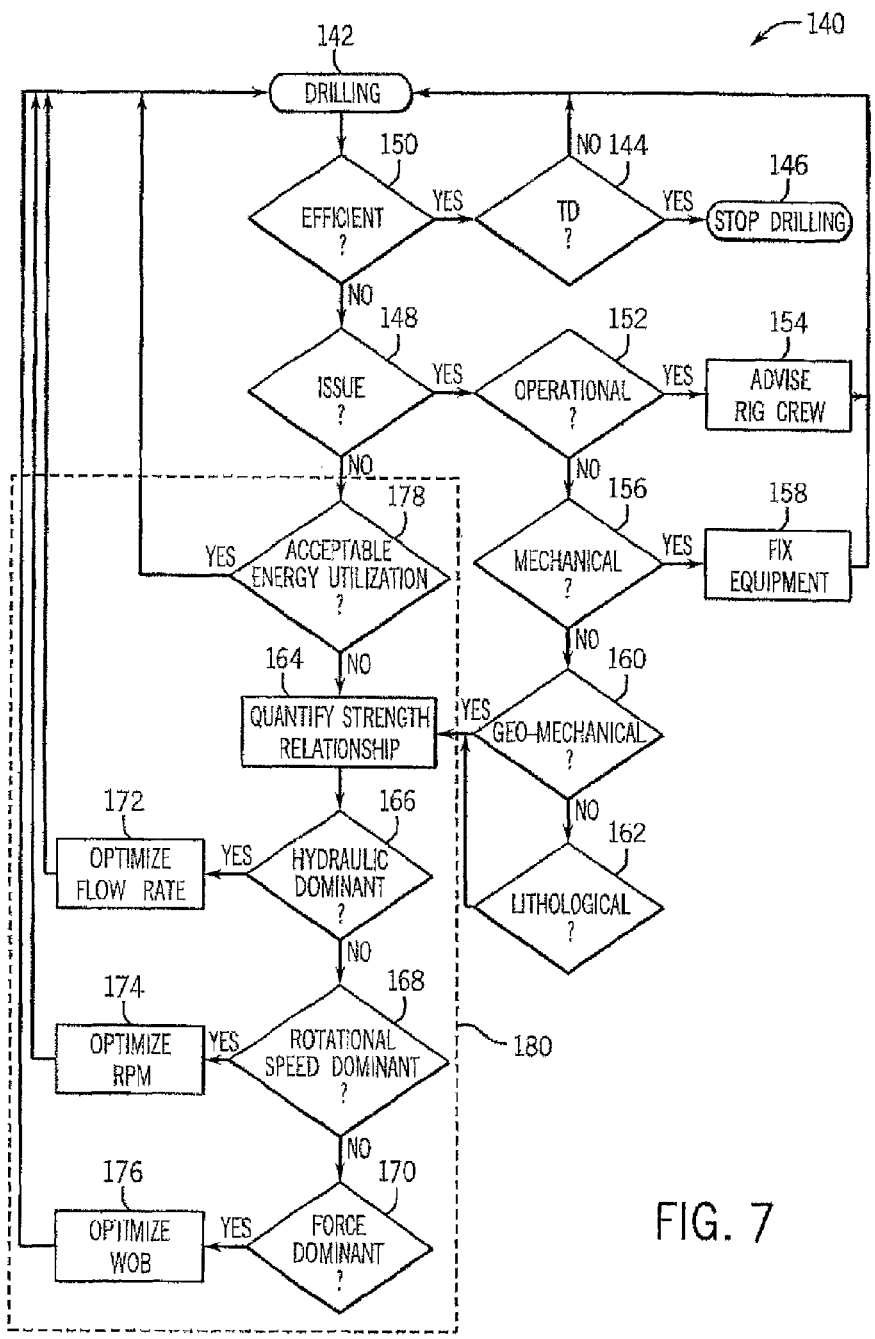
FIG. 7 is a process flow diagram of a method for drilling a well to completion, including determining and mitigating drilling issues and assessing drilling efficiency in accordance with embodiments disclosed herein.

FIG. 7 is a process flow diagram of a method 140 for drilling a well to completion and responding to potential drilling issues throughout the drilling process. The method 140 includes drilling, indicated by block 142, until the well reaches a desired tool depth (TD), indicated by block 144. Once the TD is reached, an operator may stop the drilling process, indicated by block 146. However, drilling issues may occur before the well reaches TD, as indicated by block 148, and these drilling issues may need to be addressed before drilling is continued. Drilling efficiency, indicated in block 150, may be evaluated in order to determine the outset of such drilling issues. That is, the relative amount of energy consumed through the drilling process may be quantified and compared with the drilling performance value to determine efficiency of the drilling process. It should be noted that an increase or decrease in drilling efficiency may not equate to change in ROP, especially when an autodriller is used to alter drilling parameters in order to maintain a certain ROP. Drilling efficiency may also be assessed by processing the time series trends of various measurements taken from rig components throughout the drilling process. Indeed, such measurements as hook-load and SPP may be monitored in order to ascertain optimal levels of these parameters for cleaning cuttings out of the well bore under any drilling environment.

If the calculated drilling efficiency indicates the outset of a drilling issue, the issue may be identified as operational, indicated by block 152. Operational issues may be mitigated through case-based reasoning derived from a local or remote database system or by reference to past performance of the drilling rig completed near similar operations, and upon determining an appropriate mitigation strategy, the rig crew may be advised accordingly, as indicated in block 154. The issue may otherwise be mechanical, as indicated in block 156, identified reactively or predictively by mechanical health monitoring systems. Mechanical issues may be mitigated through appropriate maintenance, repairs, or replacement of drilling equipment, as indicated by block 158. To that end, a computerized system may be used to trigger supply-chain processes for replenishing spares, tools, consumables, and the like. Other issues that may be identified from the drilling efficiency calculation include geo-mechanical and lithological issues, as shown in blocks 160 and 162, respectively. In order to mitigate these issues, disclosed embodiments may be utilized to quantify a strength relationship between the inefficiency and the drilling parameters, as indicated by block 164. The results of the evaluation may be hydraulic dominant, rotational speed dominant, or force dominant, as indicated by blocks 166, 168, and 170, respectively. In the hydraulic dominant case, the flow rate may be optimized, indicated by block 172, in order to increase drilling efficiency, thereby mitigating the issue. Likewise, in the rotational speed dominant case, the RPM may be adjusted to mitigate the issue, as in block 174, and in the force dominant case, the WOB may be adjusted, as in block 176.

Relative energy quantification, indicated in block 178, may be used to distinguish between drilling operations with normally low performance values and drilling issues that may be mitigated through the correlation strength quantification of block 164. This energy quantification 178 involves determining the deviation of a relative energy value from a desired value, as previously discussed. When a drill bit is dull or a formation is particularly hard, the energy quantification of block 178 may differentiate between drilling issues that may be mitigated by adjusting the drilling parameters or normally low performance of the drilling rig 10, because the energy values are compared with previous values of energy consumption.

The method 140 also illustrates block 180, which contains the energy quantification, strength relationship quantification, and mitigation techniques related to each dominant drilling parameter. Block 180 is representative of the process performed on each set of drilling parameter values and drilling performance values received by the drilling system. In addition, the drilling system may continually analyze energy consumption over time, in order to ascertain the effectiveness of mitigation strategies that are used. By continually determining deviations of energy consumption and necessary adjustments to drilling parameter values, the drilling system may allow for relatively more efficient drilling throughout the well formation process.

Figure 8:
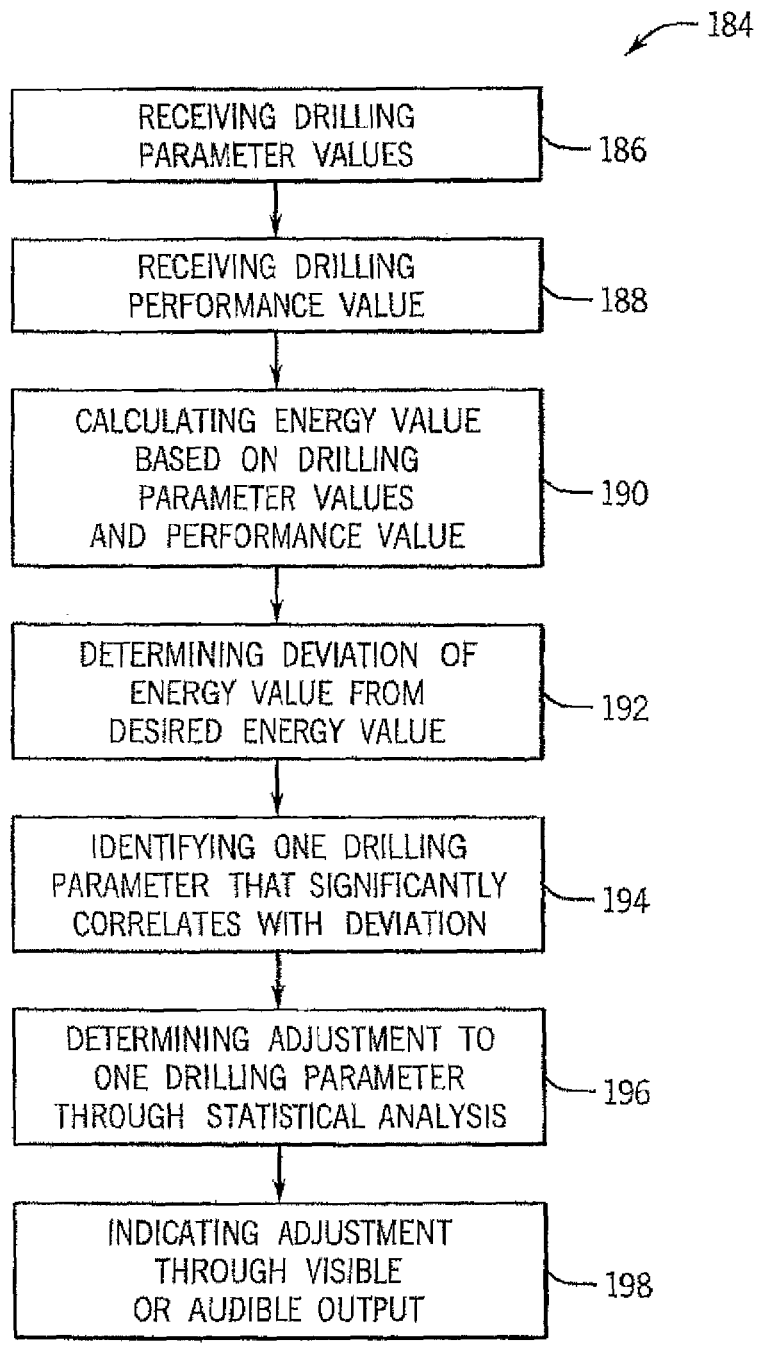
FIG. 8 is a process flow diagram of a method for detecting inefficient drilling and determining an appropriate adjustment to the drilling parameters for mitigating the inefficiency in accordance with present techniques.

FIG. 8 is a process flow diagram of a method 184 for identifying and addressing drilling issues through energy consumption analysis in accordance with present techniques. It should be noted that the method 184 may be implemented as a computer or software program (e.g., code or instructions) that may be executed by the processor 86 to execute one or more of the steps of the method 184. Additionally, the program (e.g., code or instructions) may be stored in any suitable article of manufacture that includes at least one tangible non-transitory, computer-readable medium that at least collectively stores these instructions or routines, such as the memory component 88 or the storage component 90.

The method 184 includes receiving drilling parameter values related to operation of a drilling rig, as indicated in block 186. The drilling parameter values include at least a force on a drill bit of the drilling system, a rotational speed of a drilling feature, and a torque applied by a drilling feature (e.g., for cutting rock). The drilling parameter values may also include flow rate of drilling mud pumped through the drilling rig, among other related parameters. These drilling parameter values may be monitored via sensors located about the drilling rig. In addition to receiving drilling parameter values, the method 184 includes receiving a drilling performance value, as indicated in block 188. This drilling performance value, which is indicative of drilling progression, may include a drilling efficiency value or a value related to the rate of penetration (ROP), i.e., the rate at which a drill string of the drilling rig is advanced into a well bore. The method 184 also includes calculating an energy value based on the drilling parameter values and the performance value, as indicated in block 190. The energy value may be MSE, DSE, or some other energy value that is linearly related to the drilling parameter values and proportional to the drilling performance value. This energy value may be representative of energy consumed in the process of destroying rock. Further, the method 184 includes determining a deviation of the calculated energy value from a desired energy value, as indicated in block 192. The deviation may indicate outset of a drilling issue if the deviation is larger than a standard deviation of the energy values calculated over an extended period of time.

In response to a relatively large deviation that indicates entropy or a drilling issue, the method 184 includes identifying one drilling parameter value that significantly correlates with the deviation of the energy value, as shown in block 194. The drilling parameter value may be determined through a transient standard deviation and/or variance analysis of the drilling parameter values with respect to the deviation of the energy value. Correlation coefficients, expressed in terms of probability, for the relationship of each drilling parameter value to the deviation of the energy value may be calculated and compared. Indeed, the drilling parameter value that significantly correlates to the deviation may be the drilling parameter value that most predominantly varies with the calculated energy value (i.e., the drilling parameter value with the highest correlation coefficient). As shown in block 196, the method 184 further includes determining an adjustment to the one drilling parameter value through statistical analysis such that, when the adjustment is made to the drilling parameter value, the calculated energy value approaches the desired energy value. The statistical analysis may involve performing a single and/or multi-variable linear regression analysis to predict the effect of changing the one drilling parameter value on the other drilling parameter values, drilling performance values, and energy values. Finally, the method 184 includes indicating the adjustment through a visible or audible output, as indicated in block 198. The output may include an audible alarm or a visual display showing both a prediction of the drilling issue associated with the deviation of the energy value and the adjustment determined to mitigate the drilling issue. In some embodiments, automatic adjustments may be performed to compensate for the drilling issue.

The method 184 may include continuing interpretation of correlation coefficients that relate the drilling parameter values to the deviation of the energy value throughout drilling operations. This may inform rig operators of the effectiveness of adjustments identified using the method 184. By continually analyzing energy consumption in this way and making appropriate adjustments to drilling parameters, the method 184 may extend the life of the drill bit, improve well bore quality, and reduce non-productive time during drilling processes. In addition, drilling efficiency may be assessed by processing the time series trends of the different drilling parameters and measurements.

Further, one or more embodiments of the present disclosure are directed to a drilling monitoring system for monitoring drilling parameter values and drilling performance of a drill rig. Displays showing string charts that plot all drilling parameters may be unduly complicated and cumbersome for an operation to review, characterize, and interpret on a routine and timely basis. The drilling monitoring system according to one or more embodiments of the present disclosure are directed to a display presenting the drilling process variables (e.g., drilling parameters) or drilling process variable subsets, as well as relative drilling energy values, in a simplified manner.

In one or more embodiments, the display may show and identify a first potential operational issue area, such as mechanical performance, a second potential operational issue area, such as hydraulic efficiency, and a third potential operational issue area, such as geo-mechanical integrity. In one or more embodiments, each of the potential operational issue areas may be displayed in one of a first portion, a second portion, and a third portion of the display. Further, the display may show overall entropy of the system (i.e., drilling efficiency of the drilling system) by comparing a calculated energy value to a desired energy value, as will be discussed below. The display may show the entropy of the drilling system in a fourth portion of the display. The entropy of the system may be impacted by adjusting one or more drilling parameters, which may include RPM, WOB, and GPM. In one or more embodiments, each of these drilling parameters, as well as any other drilling parameter known in the art, may be altered or adjusted using the display.

In one or more embodiments, the drilling system may quantify the amount of excess energy in the drilling system and may derive deviations in performance that are based on real-time regression analysis and/or an offset data analysis using Case-Based Reasoning. The display may show how the quantity of excess energy in the drilling system may be allocated to different potential operational issues. Further, the display may provide a graphical user interface to allow a user, e.g., a drilling operator, to adjust one or more drilling parameters to optimize drilling performance of the drilling system through interaction with the display, as will be discussed below.

In one or more embodiments, the display may be a rectangular display. The rectangular display may include one or more portions defining one or more potential operational issues. Further, the rectangular display may include one or more portions indicating a difference between a calculated energy value and a desired energy value of the drilling system. In one or more embodiments, the display may be a triangular-shaped display or other consolidated display formed to conveniently and understandingly convey information to a drilling operator.

For example, in one or more embodiments, the drilling monitoring system includes a triangular-shaped display. In one or more embodiments, the triangular-shaped display may display a comparison between a calculated energy value and a desired energy value of the drilling system. The triangular-shaped display may include a first corner portion for defining a first potential operational issue, a second corner portion for defining a second potential operational issue, a third corner portion for defining a third potential operational issue, and a central portion indicating the comparison between the calculated energy value and the desired energy value of the drilling system. As discussed above, the calculated energy value may be determined through equations (1) and (2) as MSE and DSE, respectively. However, those having ordinary skill in the art will appreciate that other relative energy values may be calculated such that the energy value is linearly correlated with the drilling parameter values (e.g., at least WOB, RPM, and torque) and proportional to the ROP of the drilling system. Further, as discussed above, the desired energy value may be calculated from code stored in a memory component from previously calculated or observed energy requirements from previous trips. Furthermore, as discussed above, the calculated energy value may be linearly related to the drilling parameter values and may also be proportional to the drilling performance value.

For example, in one or more embodiments, the drilling monitoring system may include a communication component (e.g., the communication component 80 of FIG. 5) for receiving drilling parameter values and a drilling performance value related to operation of the drilling system, and a memory component (e.g., the memory component 88 of FIG. 5) for storing code adapted to calculate the calculated energy value as well as code adapted to calculate the desired energy value. Further, the drilling monitoring system may include a processor (e.g., the processor 86 of FIG. 5) coupled to the communication component and the memory component and may use code stored in the memory component to calculate the calculated energy value and determine an adjustment to a drilling parameter such that, when the adjustment to the drilling parameter is made, the calculated energy value approaches the desired energy value. In one or more embodiments, the processor may also determine a deviation of the calculated energy value from the desired energy value, which may be displayed as entropy of the drilling system, as will be discussed below.

Figure 9E:
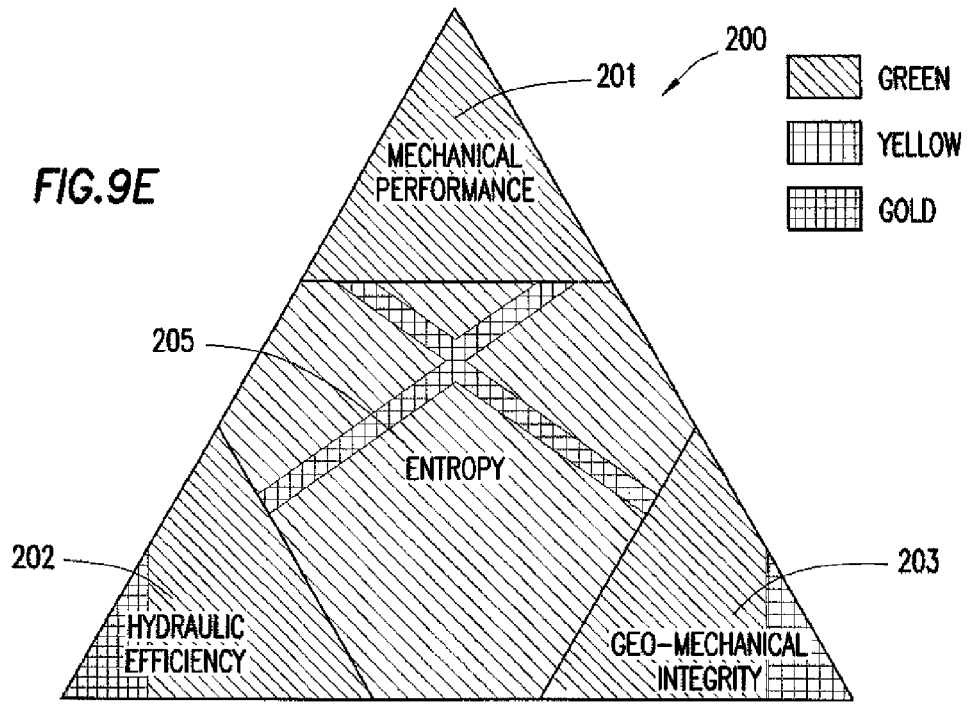
FIG. 9E shows the display of FIG. 9D, in which the overall system entropy has been reduced due to the changes in some of the drilling parameters implemented in FIG. 9D.
Figure 9F:
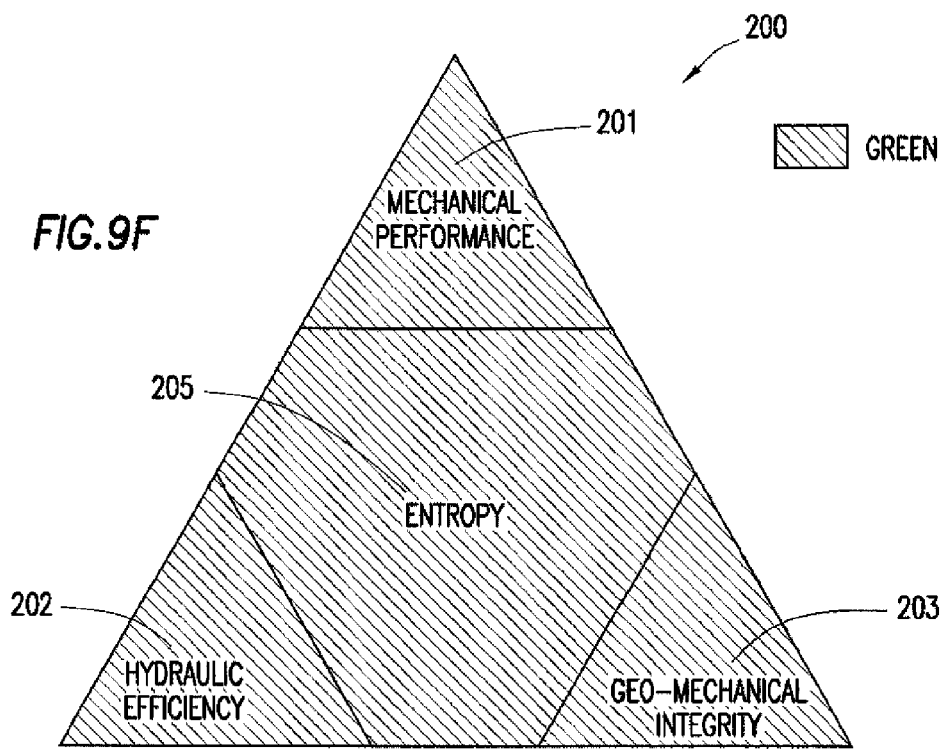
FIG. 9F shows the display of FIG. 9E, in which the overall system entropy has been further reduced to an optimal level.

FIGS. 9A-9F show an example embodiment of a display 200 for a drilling monitoring system in accordance with embodiments disclosed herein. Although not shown in color, FIGS. 9A-9F intend to show color display, resembling a heat map, to show levels and distribution of entropy in the drilling system, which may be attributed to one or more potential operational issues, defined by specific portions of the display 200. FIG. 9A shows a display showing relatively high entropy in the drilling system, particularly relating to flow rate and/or hydraulic efficiency. FIG. 9B shows the display of FIG. 9B, in which hydraulic efficiency has been targeted as the problem area. FIG. 9C shows the display of FIG. 9B, in which the system entropy relating to hydraulic efficiency has been reduced, and the mechanical performance of the drilling system has been targeted as the problem area. FIG. 9D shows the display of FIG. 9C, in which the system entropy relating to hydraulic efficiency has been further reduced due to changes in some of the drilling parameters, and the mechanical performance of the drilling system has still been targeted as the problem area. FIG. 9E shows the display of FIG. 9D, in which the overall system entropy has been reduced due to the changes in some of the drilling parameters implemented in FIG. 9D. FIG. 9F shows the display of FIG. 9E, in which the overall system entropy has been further reduced to an optimal level.

As shown in FIGS. 9A-9F, the display 200 is a triangular-shaped display and may include a first corner portion 201 for defining a first potential operational issue, a second corner portion 202 for defining a second potential operational issue, a third corner portion 203 for defining a third potential operational issue, and a central portion 205 indicating the comparison between the calculated energy value and the desired energy value of the drilling system. In one or more embodiments, the display 200 may replace the display 92 in the drilling system 78 shown in FIGS. 5 and 6. Further, those having ordinary skill in the art will appreciate that the display 200 is not limited to being only a triangular-shaped display having three corner portions 201, 202, 203, and a central portion 205. For example, in one or more embodiments, the display 200 may include four, five, six, or more portions, not necessarily corner portions, in which each portion defines a different operational issue, and another portion indicating the comparison between the calculated energy value and the desired energy value of the drilling system.

In one or more embodiments, the first potential operational issue may be hydraulic efficiency, the second potential operational issue may be mechanical performance, and the third potential operational issue may be geo-mechanical integrity. However, those having ordinary skill in the art will appreciate that each of the first, second, and third potential operational issues may be any one of these categories. Further, those having ordinary skill in the art will appreciate that other potential operational issues may be identified and represented on the triangular-shaped display 200. For example, other potential operation issues may include lithological issues or any other operational issue known in the art, which may be governed by any combination of any number of drilling parameters.

Further, the entropy of the drilling system, which may be defined by a comparison between the calculated energy value and the desired energy value of the drilling system, may be indicated in the central portion 205 of the display 200. As discussed above, the entropy of the drilling system may be referred to as the inefficiency of drilling system, e.g., variation within the calculated MSE and DSE, indicating the outset of drilling issues such as dysfunction of the drill bit 34, bit-balling, slip/stick vibrations of the drill string 28, and the like. As such, a low deviation between the calculated energy value and the desired energy value of the drilling system results in a low entropy of the drilling system, and a high deviation between the calculated energy value and the desired energy value of the drilling system results in a high entropy of the drilling system. In one or more embodiments, the processor (e.g., the processor 86 of FIG. 5) determines a deviation of the calculated energy value from the desired energy value.

In one or more embodiments, a first range of deviation of the calculated energy value from the desired energy value is displayed on the display 200 in a first color (e.g., green), a second range of deviation of the calculated energy value from the desired energy value is displayed on the display 200 in a second color (e.g., yellow), and a third range of deviation of the calculated energy value from the desired energy value is displayed on the display 200 in a third color (e.g., red). In one or more embodiments, the first range of deviation may be less than the second range of deviation, and the second range of deviation may be less than the third range of deviation. In other words, as shown in FIGS. 9A-9F, low entropy (i.e., high drilling efficiency) is indicated by green, high entropy (i.e., poor drilling efficiency) is indicated by red, and the intermediate range of entropy of the drilling system (i.e., the range of deviation between green and red) is indicated by yellow. As such, the goal of a user monitoring the drilling system operatively connected to the display 200 is to achieve and maintain high efficiency drilling (i.e., low entropy), which is shown, for example, in FIG. 9F.

In order to reduce the entropy of the drilling system, various drilling parameters (e.g., WOB, RPM, gallons per minute (GPM) of mud flow, and torque) may be manipulated to adapt to the current formation and drilling conditions and to optimize ROP. For example, FIG. 9B shows the display 200 showing relatively high entropy in the drilling system because the central portion 205 is yellow/red. Further, according to the display 200 of FIG. 9B, the relatively high entropy of the drilling system may be due to hydraulic efficiency issues because the second corner portion 202 is red.

Those having ordinary skill in the art will appreciate that each of the first, second, and third colors are not limited to green, yellow, and red, respectively. In one or more embodiments, the purpose of indicating the different ranges of deviation of the calculated energy value from the desired energy value with different colors is to allow a user to easily visualize the different ranges of deviation with contrasting colors associated with each range of deviation. As such, any color in the color spectrum may be used to identify any range of deviation of the calculated energy value from the desired energy value on the display 200. Additional colors/ranges may also be used.

A display used in the drilling system described in the present disclosure may include interactive features for a user to use to interact with the drilling system. For example, the display may include a mouse/keyboard, joystick, and/or a touch-screen to allow a user to select options and make adjustments to the drilling system. For example, in one or more embodiments, the display 200 may include a touch-screen interface and may be configured to interact with each of the first corner 201 associated with mechanical performance, the second corner portion 202 associated with hydraulic efficiency, and the third corner portion 203 associated with geo-mechanical integrity. Further, in one or more embodiments, interaction with each one of the first corner portion 201, the second corner portion 202, and the third corner portion 203 may provide an adjustment to a drilling parameter related to the corresponding operational issue. As such, in one or more embodiments, to address an issue dealing with hydraulic efficiency and to reduce the entropy of the drilling system, a user may use the touch-screen interface of the display 200 and touch the second corner portion 202 of the display 200.

Interacting with the second corner portion 202 of the display 200 may result in adjustments being calculated and suggested by the drilling system (e.g., by the processor 86 of FIG. 5) for drilling parameters encompassed by the issue of hydraulic efficiency. As discussed above, calculating adjustments of a drilling parameter may include determining an adjustment to the drilling parameter value through statistical analysis such that, when the adjustment is made to the drilling parameter value, the calculated energy value approaches the desired energy value. The statistical analysis may involve performing a single and/or multi-variable linear regression analysis to predict the effect of changing the one drilling parameter value on the other drilling parameter values, drilling performance values, and energy values. The statistical analysis may derive deviations in drilling parameters that are based on real-time regression analysis and/or an offset data analysis using Case-Based Reasoning. Predicting the effect or changes each drilling parameter has on the value of other drilling parameter values, drilling performance values, and energy values may allow problems with drilling downhole to be identified and mitigated/eliminated at or near the outset of the problem, which may save valuable time and equipment (e.g., eliminating a problem before a drill bit or other component breaks or needs servicing).

In one or more embodiments, the adjustments to the drilling parameter(s) calculated by the system may be either automatically implemented or manually implemented by a user. Different adjustments and combinations of adjustments to various drilling parameters may be implemented or suggested by the drilling system to reduce the entropy of the drilling system. In automatic implementation, the processor may automatically implement an adjustment to a drilling parameter associated with one of the first operational issue (e.g., mechanical performance), the second operational issue (e.g., hydraulic efficiency), and the third operational issue (e.g., geo-mechanical integrity) when the deviation of the calculated energy value from the desired energy shown in any of the first corner portion 201, the second corner portion 202, and the third corner portion 203 is outside of the first range of deviation of the calculated energy value from the desired energy value. In other words, in automatic implementation according to the exemplary embodiments shown in FIGS. 9A-9F, the processor may automatically adjust drilling parameters associated with one of the three operational issues if one of the corner portions is not green. The processor may continue to adjust drilling parameters based on statistical analysis described above until the central portion of the display 200 is green (i.e., low entropy of the drilling system and efficient drilling). As such, the display 200 may update automatically and show the convergence of physical measurements to the automatic adjustments to drilling parameters.

Further, in one or more embodiments, the user may override the automatic adjustment process of the processor of the drilling system. Specifically, in one or more embodiments, the user may use the touch-screen interface or a joystick or mouse operatively connected to the display 200 to override the automatic adjustment process of the drilling parameters, and the user may choose to stop the drilling process, set process variables, adjust one or more drilling parameters of the drilling system in a manner that is different from the adjustments calculated and suggested by the processor, and/or readjust one or more drilling parameters in the drilling system.

In one or more embodiments, the user may override the automatic adjustment process of the processor and set specific drilling parameters for the drilling system. For example, the user may override the automatic adjustment process of the processer and set the RPM of the drilling system to 100 RPM and the GPM of the drilling system to 1000 GPM. As such, in one or more embodiments, the user may override the automatic adjustment process of the processer, set one or more drilling parameters to a specific value, and allow the drilling system to automatically calculate and optimize the other drilling parameters.

Alternatively, in one or more embodiments, the user may override the automatic adjustment process of the processor and set specific ranges for one or more drilling parameters, between which the drilling system is to operate. For example, the user may override the automatic adjustment process of the processor and set an operating range for RPM to be 80-100 RPM, and the drilling system may continue to adjust the RPM of the drilling system automatically, based on calculated values by the processor, but within the range set by the user. This may be advantageous in the event of an emergency, in which the user, e.g., the operator, may use his/her experience in the field to override the automatic adjustment process of the drilling system to help safeguard the equipment of the drilling system.

As such, the display and the drilling system according to embodiments disclosed herein may provide quantification of excess energy in the drilling system (i.e., entropy of the drilling system), the display and the drilling system may correlate energy misuse within the drilling system (e.g., by attributing the system entropy to one or more potential operating issues shown on the display), the drilling system may apply corrective action (e.g., adjustments to one or more drilling parameters calculated by the processor of the drilling system), and the drilling system and/or the user may verify the effectiveness of the corrective action (e.g., the display will show the impact of the adjustments to the drilling parameters on the entropy of the drilling system as well as current drilling parameters). In other words, the display and the drilling system according to embodiments disclosed herein may react at the outset of a potential operation issue, whereas other drillers may react based purely on performance degradation (e.g., overall reduction in ROP). Further, the display and the drilling system according to embodiments disclosed herein may identify the root cause and/or associated causal factors, whereas other drillers may focus on varying only one drilling parameter. Furthermore, the display and the drilling system according to embodiments disclosed herein may apply a corrective action (e.g., adjusting one or more drilling parameters) at the outset of a potential operation issue, whereas other drillers may assume that performance degradation is due to a shortage of input energy. Further, the display and the drilling system according to embodiments disclosed herein may ascertain effectiveness of the corrective action, whereas other drillers may inadvertently augment the issue.

As shown in FIGS. 9B-9D, the display 200 also includes a first side 211 defining a first scale, a second side 212 defining a second scale, and a third side 213 defining a third scale. Further, as shown in FIGS. 9B-9D, the first scale is WOB, the second scale is RPM, and the third scale is GPM. Those having ordinary skill in the art will appreciate that each of the first scale, the second scale, and the third scale may be any drilling parameter known in the art and may depend on the designation of potential operational issues in each of the three corner portions of the display 200 of the primary variables that are controlled by the drilling operator for a particular drilling rig. Further, those having ordinary skill in the art will appreciate that this display 200 is not limited to being a triangular-shaped display. For example, as discussed above, the display, according to embodiments disclosed herein, may be a rectangular-shaped display. The rectangular-shaped display may include four sides, in which each side defines a different scale. In one or more embodiments, each of the scales may illustrate the current or active range of operational limits for the given set of drilling parameters (e.g., WOB, RPM, and GPM). In one or more embodiments, ranges of each of the drilling parameters may be fixed according to a drilling program for a specific well, or a specific operation such as sliding or managed pressure drilling.

Furthermore, as shown in FIGS. 9B-9D, both current drilling parameter values (denoted by nodes 215A, 215B, and 216C) as well as adjustment parameter values (denoted by nodes 216A, 216B, and 216C) determined by the processor may be displayed on the corresponding scale of the display 200. In other words, the suggested changes to the drilling parameters (denoted by nodes 216A, 216B, and 216C) may be shown on each of the respective scales along with current drilling parameter values (denoted by nodes 215A, 215B, and 216C) for the convenience of the user. For example, referring back to FIG. 9B, the display 200 showing relatively high entropy in the drilling system because the central portion 205 is yellow/red. Further, according to the display 200 of FIG. 9B, the relatively high entropy of the drilling system may be due to hydraulic efficiency issues because the second corner portion 202 is red. A user may use the touch-screen interface of the display 200 to address the hydraulic efficiency issue in the second corner portion 202 by touching the second corner portion 202 of the display 200. As such, the second corner portion 202 is selected, indicated by selection element 210, and the processor may suggest changes to the drilling parameters denoted on the scales of each of the sides 211, 212, and 213 of the display.

In one or more embodiments, the selection element 210 may be a cursor. The selection element 210 may be superimposed on the display 200, and the position of the selection element 210 may directly correlate to the drilling parameters. The user may use the touch-screen interface of the display 200 to drag the selection element 210 from one area of interest (i.e., one corner portion of the display 200) to another area of interest (i.e., another corner portion of the display 200) to address another potential operational issue. For example, the user may drag the selection element 210 from the second corner portion 202, as shown in FIG. 9B, to the first corner portion 201, shown in FIG. 9C to address mechanical performance. The above-mentioned dragging of the selection element 210 may be achieved through the user touching the touch-screen interface with a stylus and/or his/her finger and/or through the use of a joystick or mouse. In one or more embodiments, the selection element 210 may be dragged onto an area of the display 200 (e.g., one of the corner portions) for the purpose of triggering a change to all of the drilling parameters (e.g., WOB, RPM, GPM, and/or the entropy of the drilling system). Alternatively, in one or more embodiments, the selection element 210 may be dragged onto an area of the display 200 such that one drilling parameter is fixed (e.g., the entropy of the drilling system) and the other drilling parameters may be changed. Furthermore, in one or more embodiments, the selection element 210 may be dragged onto an area of the display 200 such that two drilling parameters are fixed (e.g., the entropy of the drilling system and WOB) and the other drilling parameter may be changed.

As discussed above, in one or more embodiments, the display 200 may illustrate the convergence of the physical measurements of the drilling system to the suggested adjustments to the drilling parameters should the user choose to apply the suggested adjustments to one or more of the drilling parameters (denoted by nodes 216A, 216B, and 216C). In other words, the display 200 may update instantaneously and show how adjusting one or more drilling parameters directly affects other drilling parameters as well as the drilling efficiency (e.g., the entropy) of the drilling system.

Further, as discussed above, the suggested changes to the drilling parameters determined by the processor may be calculated based on statistical analysis described above. Subsequently, the suggested changes to the drilling parameters denoted on the scales of each of the sides 211, 212, and 213 of the display may be shown on the respective scales (denoted by nodes 216A, 216B, and 216C), and the user may choose which drilling parameters, and to what degree, and/or the rate of change of the variable which should be adjusted in view of the suggested changes in order for the calculated energy value to approach the desired energy value (i.e., to improve drilling efficiency of the drilling system and to minimize entropy of the drilling system). Alternatively, as discussed above, the processor may be configured to automatically adjust drilling parameters in order for the calculated energy value to approach the desired energy value. Further, as discussed above, the user override the automatic adjustment process. Specifically, in one or more embodiments, the user may use the touch-screen interface or a joystick or mouse operatively connected to the display 200 to override the automatic adjustment process of the drilling parameters, and the user may choose to adjust one or more drilling parameters of the drilling system in a manner that is different from the adjustments calculated and suggested by the processor.

The display 200 described above may convey drilling information about a drilling system more simply to a user because the display 200 not only displays the overall entropy of the drilling system, but the display 200 also identifies potential operational issues visually with contrasting colors to inform the user of both the overall performance of the system as well as what issues may be developing that may be keeping the drilling system from performing optimally. This simplified display may require fewer users or drilling experts to monitor and maintain multiple drilling systems simultaneously and remotely by displaying the drilling performance of the drilling system, identifying potential operational issues, determining adjustments to drilling parameters to mitigate or eliminate the identified operational issues, automatically implementing the adjustments to the drilling parameters, and also allowing the option of manual identification and manipulation of drilling parameters to optimize the drilling system.

Further, the statistical analysis performed by the processor to determine adjustments to drilling parameter values of the drilling system may save valuable time and equipment (e.g., eliminating a problem before a drill bit or other component breaks Of needs servicing). For example, without the display 200, a user operating a drilling system may not notice that there is an issue with the drilling system until the ROP of the drilling system is decreased. However, several operational issues (unknown to the user) may have compounded before the ROP of the drilling system actually decreased. By the time the ROP of the drilling system is decreased, operational issues may have already compounded, which may result in equipment damage and increased service time. This may be avoided with the display 200 because the display 200 may identify an operational issue at or near its outset, and the processor may adjust, or suggest adjustments, to drilling parameters to mitigate or eliminate an operational issue as soon as possible. In other words, the display 200 may help identify and eliminate operational issues that may be unknown to the user before the issues compound and result in decreased ROP of the drilling system, which may help a user avoid permanent damage to downhole equipment and may also help a user minimize service time.

Furthermore, the statistical analysis performed by the processor to determine adjustments to drilling parameter values of the drilling system may save valuable time and equipment to a user by identifying the specific type of operational issues occurring downhole that need to be addressed to optimize the drilling system. For example, without the display 200 described above, the only issue a user may notice with the drilling system is when the ROP is decreased. The decrease in ROP may be due to numerous operational issues, which may be unknown to the user without the display 200. Adjusting the wrong drilling parameters in the wrong way may adversely affect the drilling equipment downhole. For example, without being able to identify the specific issue(s) causing the ROP of the drilling system, a user may resort to increasing the WOB to try to increase the ROP. However, if the issue causing the decrease in ROP is bit bouncing, increasing the WOB will not increase the ROP. Rather, increasing the WOB when the issue is bit bouncing may cause the bit to bounce even higher, which may result in permanent damage to the drill bit and may require servicing. The display 200 would be able to identify bit bouncing as a potential operational issue at or near its outset (e.g., under geo-mechanical integrity or mechanical performance), and the statistical analysis performed by the processor may suggest reducing the WOB and adjusting other drilling parameter values in order to eliminate the bit bouncing problem. This solution may not have been intuitive to a user without being able to identify the specific problem with the display 200 described above.

According to another aspect of the present disclosure, there is provided a method for monitoring and managing a drilling system. The method may be used to maintain and optimize a drilling system and may include displaying a comparison between a calculated energy value a desired energy value, determining a deviation of the calculated energy value from the desired energy value, displaying one of a first color, a second color, and a third color based on the deviation of the calculated energy value from the desired energy value, identifying a drilling parameter value that significantly correlates with the deviation of the calculated energy value from the desired energy value, determining an adjustment to the drilling parameter value such that, when the adjustment to the drilling parameter is made, the calculated energy value approaches the desired energy value, and implementing the adjustment to the drilling parameter.

In one or more embodiments, the method for monitoring and managing a drilling system may include determining inefficiencies in a drilling system through potential operational issues, the potential operational issues including overall hydraulic efficiency, mechanical performance, and geo-mechanical integrity in the drilling system, displaying the inefficiencies in the drilling system with a comparison between a calculated energy value and a desired energy value, selecting an area of potential operational issue based on the display of the comparison between a calculated energy value and a desired energy value, calculating adjustment values for rotations per minute, weight on bit, and gallons per minute to decrease the inefficiencies in the selected area of potential operational issue, and displaying a comparison of a present value for each of rotations per minute, weight on bit, and gallons per minute with the calculated adjustment values for each of rotations per minute, weight on bit, and gallons per minute.

Further, in one or more embodiments, displaying the inefficiencies of the drilling system with a comparison between the calculated energy value and the desired energy value includes displaying one of a first color, a second color, and a third color based on a deviation range of the calculated energy value from the desired energy value. The method may also include implementing the calculated adjustment values for each of rotations per minute, weight on bit, and gallons per minute. In one or more embodiments, implementing the calculated adjustment values is automatically implemented by a processor. In one or more embodiments, implementing the calculated adjustment values is manually implemented through an interface.

As discussed above, the central portion 205 of the display 200 of FIGS. 9A-9F displays a comparison between a calculated energy value and a desired energy value (i.e., the entropy of the drilling system). A processor (e.g., the processor 86 of FIG. 5) may determine a deviation of the calculated energy value from the desired energy value, and one of a first color (e.g. green), a second color (e.g., yellow), and a third color (e.g., red) may be displayed on the display 200 based on the deviation of the calculated energy value from the desired energy value.

The drilling system may identify a drilling parameter value that significantly correlates with the deviation of the calculated energy value from the desired energy value. In one or more embodiments, identifying the drilling parameter value that significantly correlates with the deviation of the calculated energy value from the desired energy value may include identifying a drilling parameter value that most predominantly varies with the deviation of the calculated energy value from the desired energy value. For example, as shown in FIG. 9B, hydraulic efficiency is identified by the drilling system (indicated in red) as the potential operational issue governing drilling parameters which correlate with the deviation of the calculated energy value from the desired energy value. As discussed above, potential operational issues, such as hydraulic efficiency, may be addressed automatically by configuration of the processor or manually via touch-screen interface. As shown in FIG. 9B, hydraulic efficiency is addressed, indicated by the selection element 210. Further, as discussed above, the automatic adjustments of one or more drilling parameters of the drilling system may be overridden by the user, and the user may adjust one or more drilling parameters of the drilling system in a manner that is different from the adjustments calculated and suggested by the processor.

Once the drilling parameter, or potential operational issue governing one or more drilling parameters, is identified, an adjustment to the drilling parameter value may be determined such that, when the adjustment to the drilling parameter is made, the calculated energy value approaches the desired energy value. As discussed above, this adjustment may be determined by the processor through statistical analysis.

Subsequently, as shown in FIG. 9C, the adjustment to the drilling parameter may be implemented to the drilling system. This is illustrated through the change in position of the nodes 215A, 215B, and 215C along their respective scales. In one or more embodiments, the change in position of the nodes 215A, 215B, and 215C may be in view of the positions of the nodes 216A, 216B, and 216C, which may be adjustments to the respective drilling parameters determined by the processor.

Further, in one or more embodiments, if the drilling system is not yet optimized (i.e., the central portion of the display 200 is not yet green), the method described above may be repeated and another potential operational issue may be addressed and other drilling parameter values may be adjusted. For example, as shown in FIG. 9C, although the hydraulic efficiency issue was addressed (indicated by the second corner portion 202 displaying yellow instead of red), the entropy of the drilling system still remains relatively high (i.e., the central portion 205 of the display 200 is yellow and not green). As such, the first corner portion may be selected and mechanical performance of the drilling system may be addressed. The processor of the drilling system may perform statistical analysis on the drilling parameters associated with mechanical performance and may determine adjustments to mitigate or eliminate the issue(s) relating to mechanical performance. Thus, in FIG. 9D, the adjustments to the drilling parameters are implemented (illustrated by a change in position of the nodes 215A, 215B, and 215C along their respective scales). Consequently, as shown in FIGS. 9E and 9F, the entropy of the drilling system is reduced and the calculated energy value has approached the desired energy value to within the first range of deviation (illustrated in the display 200 of FIG. 9F by green).

In one or more embodiments, implementing the adjustment to the drilling parameter may be automatically implemented by a processor. Alternatively, implementing the adjustment to the drilling parameter may be manually implemented through a touch-screen interface, as discussed above. Determining the adjustment to the drilling parameter value may include performing a linear regression analysis of the drilling parameter value compared with each other drilling parameter value, the drilling performance value, and the energy value, based on past performance on the drilling rig.

Further, as discussed above, code or instructions may be stored in any suitable article of manufacture that includes at least one tangible non-transitory, computer-readable medium that at least collectively stores these instructions or routines, such as the memory component 88 or the storage component 90 of FIG. 5. In one or more embodiments, a non-transitory computer-readable medium may include code adapted to calculate an energy value from received drilling parameter values and a received drilling performance value for a drilling system, code adapted to identify a drilling parameter value that significantly correlates with a deviation of the calculated energy value from a desired energy value, code adapted to perform a statistical analysis for determining an adjustment to the drilling parameter value such that, when the adjustment is made, the energy value approaches the desired energy value, and code adapted to display a comparison between a calculated energy value a desired energy value on a triangular-shaped display. In one or more embodiments, the display may include a first corner portion defining a first potential operational issue, a second corner portion defining a second potential operational issue, a third corner portion defining a third potential operational issue, and a central portion indicating the comparison between the calculated energy value compared and the desired energy value of the drilling system.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A system comprising:
 a display for displaying a comparison between a single calculated energy value for a drilling system and a desired energy value of the drilling system, the display comprising:
  a first portion defining a first potential operational issue;
  a second portion defining a second potential operational issue;
  a third portion defining a third potential operational issue; and a fourth portion indicating the comparison between the calculated energy value compared and the desired energy value of the drilling system, wherein the first, second, and third portions are corner portions, and the fourth portion is a central portion, and wherein the display comprises a touch-screen interface configured to interact with each of the first portion associated with the first operational issue, the second portion associated with the second operational issue, and the third portion associated with the third operational issue, and wherein the interaction with any of the first portion, the second portion, or the third portion provides an adjustment value to a drilling parameter related to the corresponding operational issue.

2. The system of claim 1, wherein the display is a triangular-shaped display.

3. The system of claim 1, wherein the first operational issue is downhole hydraulic efficiency, the second operational issue is downhole mechanical performance, and the third potential operational issue is downhole geo-mechanical integrity.

4. The system of claim 1, further comprising:
a communication component for receiving drilling parameter values and a drilling performance value related to operation of the drilling system.

5. The system of claim 1, the display further comprising:
a first side defining a first scale of a first drilling parameter;
a second side defining a second scale of a second drilling parameter; and
a third side defining a third scale of a third drilling parameter,
wherein the first scale is weight on bit, the second scale is rotations per minute, and third scale is gallons per minute.

6. The system of claim 1, further comprising:
a memory component for storing code adapted to calculate the calculated energy value.

7. The system of claim 6, further comprising:
a processor coupled to the communication component and the memory component and for using code stored in the memory component to calculate the calculated energy value and determine an adjustment to a drilling parameter such that, when the adjustment to the drilling parameter is made, the calculated energy value approaches the desired energy value.

8. The system of claim 7, wherein the processor determines a deviation of the calculated energy value from the desired energy value.

9. The system of claim 8, wherein the display further identifies the drilling parameter value that significantly correlates with the deviation of the calculated energy value from the desired energy value by identifying a drilling parameter value that most predominantly varies with the deviation of the calculated energy value from the desired energy value.

10. The system of claim 8, wherein a first range of the deviation of the calculated energy value from the desired energy value is displayed on the display in a first color, a second range of the deviation of the calculated energy value from the desired energy value is displayed on the display in a second color, and a third range of the deviation of the calculated energy value from the desired energy value is displayed on the display in a third color.

11. The system of claim 10, wherein the processor automatically implements an adjustment to a drilling parameter associated with one of the first operational issue, the second operational issue, and the third operational issue when the deviation of the calculated energy value from the desired energy shown in any of the first portion, the second portion, and the third portion, respectively, is outside the first range of deviation of the calculated energy value from the desired energy value.

12. The system of claim 1, wherein both current drilling parameter values and the adjustment to a drilling parameter value determined by the processor are displayed on a corresponding scale of the display, the corresponding scale being located on a side extending between two corner portions.

13. A method comprising:
determining inefficiencies in a drilling system through potential operational issues, the potential operational issues including overall:
hydraulic efficiency of the drilling system;
mechanical performance of the drilling system; and
geo-mechanical integrity of the drilling system;
displaying the inefficiencies in the drilling system with a comparison between a calculated energy efficiency value and a desired energy efficiency value, wherein displaying the inefficiencies includes allocating entropy in the drilling system to each of hydraulic efficiency, mechanical performance, and geo-mechanical integrity of the drilling system, and displaying relative levels and distribution of the entropy allocated to each of the hydraulic efficiency, mechanical performance, and geo-mechanical integrity of the drilling system;
selecting an area of potential operational issue based on the display of the comparison between a calculated energy efficiency value and a desired energy efficiency value;
calculating adjustment values for drilling parameter values including each of rotations per minute, weight on bit, and gallons per minute to decrease the inefficiencies in the selected area of potential operational issue;
displaying a comparison of a present value for each of rotations per minute, weight on bit, and gallons per minute with the calculated adjustment values for each of rotations per minute, weight on bit, and gallons per minute; and
implementing the calculated adjustment values for each of rotations per minute, weight on bit, and gallons per minute,
wherein implementing the calculated adjustment values is automatically implemented by a processor.

14. The method of claim 13, wherein displaying the inefficiencies of the drilling system with a comparison between the calculated energy efficiency value and the desired energy efficiency value includes displaying at least one of a first color, a second color, or a third color based on a deviation range of the calculated energy value from the desired energy value.

15. A non-transitory computer-readable medium comprising:
code adapted to calculate a single energy value from received drilling parameter values and a received drilling performance value for an overall drilling system;
code adapted to identify a drilling parameter value that significantly correlates with a deviation of the calculated energy value from a desired energy value;
code adapted to perform a statistical analysis for determining an adjustment to the drilling parameter value such that, when the adjustment is made, the energy value approaches the desired energy value;
code adapted to display a comparison between a calculated energy value a desired energy value on a triangular-shaped display, the display comprising:
a first corner portion defining a first potential operational issue;

a second corner portion defining a second potential operational issue;

a third corner portion defining a third potential operational issue; and a fourth central portion indicating the comparison between the calculated energy value compared and the desired energy value of the overall drilling system; and code adapted to automatically implement calculated adjustment values of the drilling parameter value directed to at least one of the first potential operational issue, the second potential operational issue, and the third potential operational issues.

16. A system comprising:

a display for monitoring a drilling operation of a drilling system in real time, including a triangular area including:

a first corner portion displaying a mechanical performance of the drilling operation;

a second corner portion displaying hydraulic efficiency of the drilling operation;

a third corner portion displaying a geo-mechanical integrity associated with the drilling operation;

a first scale extending along a first side of the display that connects the first and second corner portions, the first scale displaying a real time value of a first drilling parameter;

a second scale extending along a second side of the display that connects the second and third corner portions, the second scale displaying a real time value of a second drilling parameter;

a third scale extending along a third side of the display that connects the first and third corner portions, the third scale displaying a real time value of a third drilling parameter; and a central portion displaying an entropy of the drilling system, the entropy being color-coded to include at least one of a first color, a second color, or a third color depending upon whether the entropy is within a corresponding first, second, or third range of values, wherein the first, second, and third corner portions are further color-coded, the color-coding of the corner portions indicating the relative contribution of each of the mechanical performance, the hydraulic efficiency, and the geo-mechanical integrity to the entropy in the drilling system;

a memory component storing code; and a processor operable to execute the code to:

determine the entropy as a comparison of calculated energy efficiency to a desired energy efficiency; and generate the display, wherein the display includes a touch-screen display operable to permit a user to interact with:

the first corner portion to adjust one of the drilling parameters of the first, second, or third scales affecting the mechanical performance;

the second corner portion to adjust one of the drilling parameters of the first, second, or third scales affecting the hydraulic efficiency; and the third corner portion to adjust one of the drilling parameters of the first, second, or third scales associated with the geo-mechanical integrity.

17. The system of claim 16, the first, second, and third drilling parameters each being a different one selected from the group consisting of weight applied to a drill bit of the drilling system, rotational speed of the drill bit, and flow rate of a drilling fluid of the drilling system.

* * * * *